United States Patent
Waltho et al.

(10) Patent No.: US 7,197,083 B2
(45) Date of Patent: Mar. 27, 2007

(54) CREATION OF SPECTRAL WINDOWS THROUGH THE USE OF HIGH RATE CODE WORDS

(75) Inventors: Alan E. Waltho, San Jose, CA (US); Jeffrey L. Schiffer, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 949 days.

(21) Appl. No.: 10/028,413

(22) Filed: Dec. 21, 2001

(65) Prior Publication Data

US 2003/0169822 A1  Sep. 11, 2003

(51) Int. Cl.
*H04B 3/30* (2006.01)
*H04B 7/185* (2006.01)
*H04L 12/16* (2006.01)
*H04L 5/16* (2006.01)

(52) U.S. Cl. .................. 375/285; 375/259; 375/296; 375/316

(58) Field of Classification Search ............ 375/130, 375/135, 140, 144, 146, 259, 219, 257, 256, 375/285, 296, 346, 316
See application file for complete search history.

(56) References Cited

U.S. PATENT DOCUMENTS

| | | | | |
|---|---|---|---|---|
| 4,439,764 A | * | 3/1984 | York et al. ............. | 340/870.02 |
| 5,525,983 A | * | 6/1996 | Patel et al. .............. | 341/57 |
| 5,623,577 A | * | 4/1997 | Fielder ................... | 395/2.38 |
| 5,632,003 A | * | 5/1997 | Davidson et al. ........ | 395/2.38 |
| 6,353,912 B1 | * | 3/2002 | Uchida ................... | 714/792 |

* cited by examiner

*Primary Examiner*—Tesfaldet Bocure
(74) *Attorney, Agent, or Firm*—Blakely, Sokoloff, Taylor & Zafman LLP (57) ABSTRACT

An apparatus to process a data word includes an encoder to receive and encode the data word, wherein a power spectral density of an encoded word is lowered across a specific frequency band relative to a power spectral density of the data word. A data transmission bus is coupled with the encoder and receives the encoded word, wherein a clock frequency of the data transmission bus is selected based on the specific frequency band. A decoder coupled with the data transmission bus receives and decodes the encoded word, wherein the data word is obtained from the encoded word.

38 Claims, 10 Drawing Sheets

| 4-BIT DATA WORDS | | | | 6-BIT BALANCED ENCODED WORDS | | | | | |
|---|---|---|---|---|---|---|---|---|---|
| 0 | 0 | 0 | 0 | 0 | 0 | 0 | 1 | 1 | 1 |
| 0 | 0 | 0 | 1 | 0 | 0 | 1 | 1 | 0 | 1 |
| 0 | 0 | 1 | 0 | 0 | 0 | 0 | 1 | 1 | 1 |
| 0 | 0 | 1 | 1 | 0 | 1 | 1 | 0 | 1 | 0 |
| 0 | 1 | 0 | 0 | 0 | 1 | 1 | 0 | 0 | 1 |
| 0 | 1 | 0 | 1 | 0 | 1 | 1 | 1 | 0 | 0 |
| 0 | 1 | 1 | 0 | 0 | 0 | 1 | 0 | 0 | 1 |
| 0 | 1 | 1 | 1 | 0 | 1 | 0 | 1 | 0 | 1 |
| 1 | 0 | 0 | 0 | 1 | 0 | 1 | 0 | 1 | 0 |
| 1 | 0 | 0 | 1 | 1 | 0 | 0 | 1 | 1 | 0 |
| 1 | 0 | 1 | 0 | 1 | 0 | 0 | 1 | 0 | 1 |
| 1 | 0 | 1 | 1 | 1 | 0 | 1 | 0 | 0 | 1 |
| 1 | 1 | 0 | 0 | 1 | 1 | 0 | 0 | 1 | 0 |
| 1 | 1 | 0 | 1 | 1 | 1 | 0 | 0 | 0 | 1 |
| 1 | 1 | 1 | 0 | 1 | 0 | 0 | 1 | 1 | 0 |
| 1 | 1 | 1 | 1 | 1 | 1 | 0 | 0 | 0 | 0 |

| 7-BIT DATA WORDS | | | | | | | 9-BIT ENCODED WORDS | | | | | | | | |
|---|---|---|---|---|---|---|---|---|---|---|---|---|---|---|---|
| 0 | 0 | 0 | 0 | 0 | 0 | 0 | 0 | 0 | 1 | 0 | 0 | 1 | 0 | 1 | 1 |
| 0 | 0 | 0 | 0 | 0 | 0 | 1 | 0 | 0 | 1 | 0 | 0 | 1 | 1 | 0 | 1 |
| 0 | 0 | 0 | 0 | 0 | 1 | 0 | 0 | 0 | 1 | 0 | 1 | 0 | 0 | 1 | 1 |
| 0 | 0 | 0 | 0 | 0 | 1 | 1 | 0 | 0 | 1 | 0 | 1 | 0 | 1 | 0 | 1 |
| 0 | 0 | 0 | 0 | 1 | 0 | 0 | 0 | 0 | 1 | 0 | 1 | 0 | 1 | 1 | 0 |
| 0 | 0 | 0 | 0 | 1 | 0 | 1 | 0 | 0 | 1 | 0 | 1 | 1 | 0 | 0 | 1 |
| 0 | 0 | 0 | 0 | 1 | 1 | 0 | 0 | 0 | 1 | 0 | 1 | 1 | 0 | 1 | 0 |
| 0 | 0 | 0 | 0 | 1 | 1 | 1 | 0 | 0 | 1 | 0 | 1 | 1 | 0 | 1 | 1 |
| 0 | 0 | 0 | 1 | 0 | 0 | 0 | 0 | 0 | 1 | 0 | 1 | 1 | 1 | 0 | 0 |
| 0 | 0 | 0 | 1 | 0 | 0 | 1 | 0 | 0 | 1 | 1 | 0 | 0 | 0 | 1 | 1 |
| 0 | 0 | 0 | 1 | 0 | 1 | 0 | 0 | 0 | 1 | 1 | 0 | 0 | 1 | 0 | 1 |
| 0 | 0 | 0 | 1 | 0 | 1 | 1 | 0 | 0 | 1 | 1 | 0 | 0 | 1 | 1 | 0 |
| 0 | 0 | 0 | 1 | 1 | 0 | 0 | 0 | 0 | 1 | 1 | 0 | 1 | 0 | 0 | 1 |
| 0 | 0 | 0 | 1 | 1 | 0 | 1 | 0 | 0 | 1 | 1 | 0 | 1 | 0 | 1 | 0 |
| 0 | 0 | 0 | 1 | 1 | 1 | 0 | 0 | 0 | 1 | 1 | 0 | 1 | 0 | 1 | 1 |
| 0 | 0 | 0 | 1 | 1 | 1 | 1 | 0 | 0 | 1 | 1 | 0 | 1 | 1 | 0 | 0 |
| 0 | 0 | 1 | 0 | 0 | 0 | 0 | 0 | 0 | 1 | 1 | 0 | 1 | 1 | 0 | 1 |
| 0 | 0 | 1 | 0 | 0 | 0 | 1 | 0 | 0 | 1 | 1 | 0 | 1 | 1 | 1 | 0 |
| 0 | 0 | 1 | 0 | 0 | 1 | 0 | 0 | 1 | 0 | 0 | 1 | 0 | 0 | 1 | 1 |
| 0 | 0 | 1 | 0 | 0 | 1 | 1 | 0 | 1 | 0 | 0 | 1 | 0 | 1 | 0 | 1 |
| 0 | 0 | 1 | 0 | 1 | 0 | 0 | 0 | 1 | 0 | 0 | 1 | 0 | 1 | 1 | 0 |
| 0 | 0 | 1 | 0 | 1 | 0 | 1 | 0 | 1 | 0 | 0 | 1 | 1 | 0 | 0 | 1 |
| 0 | 0 | 1 | 0 | 1 | 1 | 0 | 0 | 1 | 0 | 0 | 1 | 1 | 0 | 1 | 0 |
| 0 | 0 | 1 | 0 | 1 | 1 | 1 | 0 | 1 | 0 | 0 | 1 | 1 | 0 | 1 | 1 |
| 0 | 0 | 1 | 1 | 0 | 0 | 0 | 0 | 1 | 0 | 1 | 0 | 0 | 1 | 0 | 1 |
| 0 | 0 | 1 | 1 | 0 | 0 | 1 | 0 | 1 | 0 | 1 | 0 | 0 | 1 | 1 | 0 |
| 0 | 0 | 1 | 1 | 0 | 1 | 0 | 0 | 1 | 0 | 1 | 0 | 0 | 1 | 1 | 1 |
| 0 | 0 | 1 | 1 | 0 | 1 | 1 | 0 | 1 | 0 | 1 | 0 | 1 | 0 | 0 | 1 |
| 0 | 0 | 1 | 1 | 1 | 0 | 0 | 0 | 1 | 0 | 1 | 0 | 1 | 0 | 1 | 0 |
| 0 | 0 | 1 | 1 | 1 | 0 | 1 | 0 | 1 | 0 | 1 | 0 | 1 | 0 | 1 | 1 |
| 0 | 0 | 1 | 1 | 1 | 1 | 0 | 0 | 1 | 0 | 1 | 0 | 1 | 1 | 0 | 0 |
| 0 | 0 | 1 | 1 | 1 | 1 | 1 | 0 | 1 | 0 | 1 | 0 | 1 | 1 | 0 | 1 |
| 0 | 1 | 0 | 0 | 0 | 0 | 0 | 0 | 1 | 0 | 1 | 1 | 0 | 0 | 1 | 0 |
| 0 | 1 | 0 | 0 | 0 | 0 | 1 | 0 | 1 | 0 | 1 | 1 | 0 | 0 | 1 | 1 |
| 0 | 1 | 0 | 0 | 0 | 1 | 0 | 0 | 1 | 0 | 1 | 1 | 0 | 1 | 0 | 0 |
| 0 | 1 | 0 | 0 | 0 | 1 | 1 | 0 | 1 | 0 | 1 | 1 | 0 | 1 | 0 | 1 |
| 0 | 1 | 0 | 0 | 1 | 0 | 0 | 0 | 1 | 0 | 1 | 1 | 0 | 1 | 1 | 0 |
| 0 | 1 | 0 | 0 | 1 | 0 | 1 | 0 | 1 | 1 | 0 | 0 | 1 | 0 | 0 | 1 |
| 0 | 1 | 0 | 0 | 1 | 1 | 0 | 0 | 1 | 1 | 0 | 0 | 1 | 0 | 1 | 0 |
| 0 | 1 | 0 | 0 | 1 | 1 | 1 | 0 | 1 | 1 | 0 | 0 | 1 | 0 | 1 | 1 |

FIG. 4C

| 7-BIT DATA WORDS | | | | | | | 9-BIT ENCODED WORDS | | | | | | | | |
|---|---|---|---|---|---|---|---|---|---|---|---|---|---|---|---|
| 0 | 1 | 0 | 1 | 0 | 0 | 0 | 0 | 1 | 1 | 0 | 0 | 1 | 1 | 0 | 0 |
| 0 | 1 | 0 | 1 | 0 | 0 | 1 | 0 | 1 | 1 | 0 | 0 | 1 | 1 | 0 | 1 |
| 0 | 1 | 0 | 1 | 0 | 1 | 0 | 0 | 1 | 1 | 0 | 0 | 1 | 1 | 1 | 0 |
| 0 | 1 | 0 | 1 | 0 | 1 | 1 | 0 | 1 | 1 | 0 | 1 | 0 | 0 | 0 | 1 |
| 0 | 1 | 0 | 1 | 1 | 0 | 0 | 0 | 1 | 1 | 0 | 1 | 0 | 0 | 1 | 0 |
| 0 | 1 | 0 | 1 | 1 | 0 | 1 | 0 | 1 | 1 | 0 | 1 | 0 | 0 | 1 | 1 |
| 0 | 1 | 0 | 1 | 1 | 1 | 0 | 0 | 1 | 1 | 0 | 1 | 0 | 1 | 0 | 0 |
| 0 | 1 | 0 | 1 | 1 | 1 | 1 | 0 | 1 | 1 | 0 | 1 | 0 | 1 | 0 | 1 |
| 0 | 1 | 1 | 0 | 0 | 0 | 0 | 0 | 1 | 1 | 0 | 1 | 0 | 1 | 1 | 0 |
| 0 | 1 | 1 | 0 | 0 | 0 | 1 | 0 | 1 | 1 | 0 | 1 | 1 | 0 | 0 | 1 |
| 0 | 1 | 1 | 0 | 0 | 1 | 0 | 0 | 1 | 1 | 0 | 1 | 1 | 0 | 1 | 0 |
| 0 | 1 | 1 | 0 | 0 | 1 | 1 | 1 | 0 | 0 | 0 | 1 | 0 | 0 | 1 | 1 |
| 0 | 1 | 1 | 0 | 1 | 0 | 0 | 1 | 0 | 0 | 0 | 1 | 0 | 1 | 0 | 1 |
| 0 | 1 | 1 | 0 | 1 | 0 | 1 | 1 | 0 | 0 | 0 | 1 | 0 | 1 | 1 | 0 |
| 0 | 1 | 1 | 0 | 1 | 1 | 0 | 1 | 0 | 0 | 0 | 1 | 0 | 1 | 1 | 1 |
| 0 | 1 | 1 | 0 | 1 | 1 | 1 | 1 | 0 | 0 | 0 | 1 | 1 | 0 | 0 | 1 |
| 0 | 1 | 1 | 1 | 0 | 0 | 0 | 1 | 0 | 0 | 0 | 1 | 1 | 0 | 1 | 0 |
| 0 | 1 | 1 | 1 | 0 | 0 | 1 | 1 | 0 | 0 | 0 | 1 | 1 | 0 | 1 | 1 |
| 0 | 1 | 1 | 1 | 0 | 1 | 0 | 1 | 0 | 0 | 0 | 1 | 1 | 1 | 0 | 0 |
| 0 | 1 | 1 | 1 | 0 | 1 | 1 | 1 | 0 | 0 | 0 | 1 | 1 | 1 | 0 | 1 |
| 0 | 1 | 1 | 1 | 1 | 0 | 0 | 1 | 0 | 0 | 1 | 0 | 0 | 0 | 1 | 1 |
| 0 | 1 | 1 | 1 | 1 | 0 | 1 | 1 | 0 | 0 | 1 | 0 | 0 | 1 | 0 | 1 |
| 0 | 1 | 1 | 1 | 1 | 1 | 0 | 1 | 0 | 0 | 1 | 0 | 0 | 1 | 1 | 0 |
| 0 | 1 | 1 | 1 | 1 | 1 | 1 | 1 | 0 | 0 | 1 | 0 | 1 | 0 | 0 | 1 |
| 1 | 0 | 0 | 0 | 0 | 0 | 0 | 1 | 0 | 0 | 1 | 0 | 1 | 0 | 1 | 0 |
| 1 | 0 | 0 | 0 | 0 | 0 | 1 | 1 | 0 | 0 | 1 | 0 | 1 | 0 | 1 | 1 |
| 1 | 0 | 0 | 0 | 0 | 1 | 0 | 1 | 0 | 0 | 1 | 0 | 1 | 1 | 0 | 0 |
| 1 | 0 | 0 | 0 | 0 | 1 | 1 | 1 | 0 | 0 | 1 | 0 | 1 | 1 | 0 | 1 |
| 1 | 0 | 0 | 0 | 1 | 0 | 0 | 1 | 0 | 0 | 1 | 0 | 1 | 1 | 1 | 0 |
| 1 | 0 | 0 | 0 | 1 | 0 | 1 | 1 | 0 | 0 | 1 | 1 | 0 | 0 | 0 | 1 |
| 1 | 0 | 0 | 0 | 1 | 1 | 0 | 1 | 0 | 0 | 1 | 1 | 0 | 0 | 1 | 0 |
| 1 | 0 | 0 | 0 | 1 | 1 | 1 | 1 | 0 | 0 | 1 | 1 | 0 | 0 | 1 | 1 |
| 1 | 0 | 0 | 1 | 0 | 0 | 0 | 1 | 0 | 0 | 1 | 1 | 0 | 1 | 0 | 0 |
| 1 | 0 | 0 | 1 | 0 | 0 | 1 | 1 | 0 | 0 | 1 | 1 | 0 | 1 | 0 | 1 |
| 1 | 0 | 0 | 1 | 0 | 1 | 0 | 1 | 0 | 0 | 1 | 1 | 0 | 1 | 1 | 0 |
| 1 | 0 | 0 | 1 | 0 | 1 | 1 | 1 | 0 | 0 | 1 | 1 | 1 | 0 | 0 | 0 |
| 1 | 0 | 0 | 1 | 1 | 0 | 0 | 1 | 0 | 0 | 1 | 1 | 1 | 0 | 0 | 1 |
| 1 | 0 | 0 | 1 | 1 | 0 | 1 | 1 | 0 | 0 | 1 | 1 | 1 | 0 | 1 | 0 |
| 1 | 0 | 0 | 1 | 1 | 1 | 0 | 1 | 0 | 0 | 1 | 1 | 1 | 1 | 0 | 0 |
| 1 | 0 | 0 | 1 | 1 | 1 | 1 | 1 | 0 | 1 | 0 | 0 | 0 | 1 | 0 | 1 |
| 1 | 0 | 1 | 0 | 0 | 0 | 0 | 1 | 0 | 1 | 0 | 0 | 0 | 1 | 1 | 0 |
| 1 | 0 | 1 | 0 | 0 | 0 | 1 | 1 | 0 | 1 | 0 | 0 | 1 | 0 | 0 | 1 |
| 1 | 0 | 1 | 0 | 0 | 1 | 0 | 1 | 0 | 1 | 0 | 0 | 1 | 0 | 1 | 0 |
| 1 | 0 | 1 | 0 | 0 | 1 | 1 | 1 | 0 | 1 | 0 | 0 | 1 | 0 | 1 | 1 |
| 1 | 0 | 1 | 0 | 1 | 0 | 0 | 1 | 0 | 1 | 0 | 0 | 1 | 1 | 0 | 0 |
| 1 | 0 | 1 | 0 | 1 | 0 | 1 | 1 | 0 | 1 | 0 | 0 | 1 | 1 | 0 | 1 |
| 1 | 0 | 1 | 0 | 1 | 1 | 0 | 1 | 0 | 1 | 0 | 0 | 1 | 1 | 1 | 0 |

FIG. 4D

| 7-BIT DATA WORDS | | | | | | | 9-BIT ENCODED WORDS | | | | | | | | |
|---|---|---|---|---|---|---|---|---|---|---|---|---|---|---|---|
| 1 | 0 | 1 | 0 | 1 | 1 | 1 | 1 | 0 | 1 | 0 | 1 | 0 | 0 | 0 | 1 |
| 1 | 0 | 1 | 1 | 0 | 0 | 0 | 1 | 0 | 1 | 0 | 1 | 0 | 0 | 1 | 0 |
| 1 | 0 | 1 | 1 | 0 | 0 | 1 | 1 | 0 | 1 | 0 | 1 | 0 | 0 | 1 | 1 |
| 1 | 0 | 1 | 1 | 0 | 1 | 0 | 1 | 0 | 1 | 0 | 1 | 0 | 1 | 0 | 0 |
| 1 | 0 | 1 | 1 | 0 | 1 | 1 | 1 | 0 | 1 | 0 | 1 | 0 | 1 | 0 | 1 |
| 1 | 0 | 1 | 1 | 1 | 0 | 0 | 1 | 0 | 1 | 0 | 1 | 0 | 1 | 1 | 0 |
| 1 | 0 | 1 | 1 | 1 | 0 | 1 | 1 | 0 | 1 | 0 | 1 | 1 | 0 | 0 | 1 |
| 1 | 0 | 1 | 1 | 1 | 1 | 0 | 1 | 0 | 1 | 0 | 1 | 1 | 0 | 1 | 0 |
| 1 | 0 | 1 | 1 | 1 | 1 | 1 | 1 | 0 | 1 | 0 | 1 | 1 | 1 | 0 | 0 |
| 1 | 1 | 0 | 0 | 0 | 0 | 0 | 1 | 0 | 1 | 1 | 0 | 0 | 0 | 0 | 1 |
| 1 | 1 | 0 | 0 | 0 | 0 | 1 | 1 | 0 | 1 | 1 | 0 | 0 | 0 | 1 | 0 |
| 1 | 1 | 0 | 0 | 0 | 1 | 0 | 1 | 0 | 1 | 1 | 0 | 0 | 0 | 1 | 1 |
| 1 | 1 | 0 | 0 | 0 | 1 | 1 | 1 | 0 | 1 | 1 | 0 | 0 | 1 | 0 | 0 |
| 1 | 1 | 0 | 0 | 1 | 0 | 0 | 1 | 0 | 1 | 1 | 0 | 0 | 1 | 0 | 1 |
| 1 | 1 | 0 | 0 | 1 | 0 | 1 | 1 | 0 | 1 | 1 | 0 | 0 | 1 | 1 | 0 |
| 1 | 1 | 0 | 0 | 1 | 1 | 0 | 1 | 0 | 1 | 1 | 0 | 1 | 0 | 0 | 1 |
| 1 | 1 | 0 | 0 | 1 | 1 | 1 | 1 | 0 | 1 | 1 | 0 | 1 | 0 | 1 | 0 |
| 1 | 1 | 0 | 1 | 0 | 0 | 0 | 1 | 0 | 1 | 1 | 0 | 1 | 1 | 0 | 0 |
| 1 | 1 | 0 | 1 | 0 | 0 | 1 | 1 | 0 | 1 | 1 | 1 | 0 | 0 | 0 | 1 |
| 1 | 1 | 0 | 1 | 0 | 1 | 0 | 1 | 0 | 1 | 1 | 1 | 0 | 0 | 1 | 0 |
| 1 | 1 | 0 | 1 | 0 | 1 | 1 | 1 | 0 | 1 | 1 | 1 | 0 | 1 | 0 | 0 |
| 1 | 1 | 0 | 1 | 1 | 0 | 0 | 1 | 1 | 0 | 0 | 0 | 0 | 0 | 1 | 1 |
| 1 | 1 | 0 | 1 | 1 | 0 | 1 | 1 | 1 | 0 | 0 | 0 | 0 | 1 | 0 | 1 |
| 1 | 1 | 0 | 1 | 1 | 1 | 0 | 1 | 1 | 0 | 0 | 0 | 0 | 1 | 1 | 0 |
| 1 | 1 | 0 | 1 | 1 | 1 | 1 | 1 | 1 | 0 | 0 | 1 | 0 | 0 | 0 | 1 |
| 1 | 1 | 1 | 0 | 0 | 0 | 0 | 1 | 1 | 0 | 0 | 1 | 0 | 0 | 1 | 0 |
| 1 | 1 | 1 | 0 | 0 | 0 | 1 | 1 | 1 | 0 | 0 | 1 | 0 | 0 | 1 | 1 |
| 1 | 1 | 1 | 0 | 0 | 1 | 0 | 1 | 1 | 0 | 0 | 1 | 0 | 1 | 0 | 0 |
| 1 | 1 | 1 | 0 | 0 | 1 | 1 | 1 | 1 | 0 | 0 | 1 | 0 | 1 | 0 | 1 |
| 1 | 1 | 1 | 0 | 1 | 0 | 0 | 1 | 1 | 0 | 0 | 1 | 0 | 1 | 1 | 0 |
| 1 | 1 | 1 | 0 | 1 | 0 | 1 | 1 | 1 | 0 | 0 | 1 | 1 | 0 | 0 | 0 |
| 1 | 1 | 1 | 0 | 1 | 1 | 0 | 1 | 1 | 0 | 0 | 1 | 1 | 0 | 0 | 1 |
| 1 | 1 | 1 | 0 | 1 | 1 | 1 | 1 | 1 | 0 | 0 | 1 | 1 | 0 | 1 | 0 |
| 1 | 1 | 1 | 1 | 0 | 0 | 0 | 1 | 1 | 0 | 1 | 0 | 0 | 1 | 0 | 0 |
| 1 | 1 | 1 | 1 | 0 | 0 | 1 | 1 | 1 | 0 | 1 | 0 | 0 | 1 | 0 | 1 |
| 1 | 1 | 1 | 1 | 0 | 1 | 0 | 1 | 1 | 0 | 1 | 0 | 0 | 1 | 1 | 0 |
| 1 | 1 | 1 | 1 | 0 | 1 | 1 | 1 | 1 | 0 | 1 | 0 | 1 | 0 | 0 | 1 |
| 1 | 1 | 1 | 1 | 1 | 0 | 0 | 1 | 1 | 0 | 1 | 0 | 1 | 0 | 1 | 0 |
| 1 | 1 | 1 | 1 | 1 | 0 | 1 | 1 | 1 | 0 | 1 | 0 | 1 | 1 | 0 | 0 |
| 1 | 1 | 1 | 1 | 1 | 1 | 0 | 1 | 1 | 0 | 1 | 1 | 0 | 0 | 1 | 0 |
| 1 | 1 | 1 | 1 | 1 | 1 | 1 | 1 | 1 | 0 | 1 | 1 | 0 | 1 | 0 | 0 |

CREATION OF SPECTRAL WINDOWS THROUGH THE USE OF HIGH RATE CODE WORDS

BACKGROUND OF THE INVENTION

1. Field of Invention

This invention relates generally to noise reduction, and more specifically to reduction of power spectral density levels of a broadband data signal using data encoding techniques.

2. Art Background

A data processing system transmits digital data words over a data transmission bus. Such a technique is widely employed in data processing systems used for a variety of purposes. Examples include personal computers, electronic cash registers, etc. To facilitate networking, which includes connecting together computers and input/output devices such as printers, scanners, etc., wireless networks may be used. The receivers for these wireless networks may be located within the same enclosure as the data devices and due to their proximity, are vulnerable to interference. A device that is part of a wireless network has a receiver and/or a transceiver to enable one-way or two-way communication with other devices on the wireless network. An example of a wireless network is the Bluetooth™ wireless network.

Transmission of data across the data transmission bus of the data processing system, often referred to in the art as a system bus, produces a broadband frequency spectrum when the time series signal representing the data word is transformed to the frequency domain. Thus, the broadband character of the data words is manifest as a background radio frequency (RF) noise level to the wireless network receiver. The magnitude of this RF noise level can be greater than the wireless network receiver's receiver noise level in the operational band of interest to the wireless network. Such a condition is undesirable, thereby reducing the wireless receiver's effective signal-to-noise ratio. A reduction in the wireless receiver's signal-to-noise ratio will limit the maximum distance that devices can be separated before the wireless network ceases to function properly.

Presently, the problem of radiated RF energy from the transmission of data along the system bus is addressed by electromagnetic shielding. This is possible since the data rate is low and the spectral noise density at the wireless receiver is not sufficient to interfere with the receiver. Electromagnetic shielding requires special material and adds cost to the data processing system. Electromagnetic shielding also requires engineering design and analysis, and is another element which increases the cost of current systems. Electromagnetic shielding is never perfect, and in some instances, particularly where the data rate is comparable to the frequency of the wireless network, will not provide adequate isolation of the wireless receiver's antenna or other components from the unwanted source of radiated RF energy, thereby degrading the performance of the wireless network.

BRIEF DESCRIPTION OF THE DRAWINGS

The present invention is illustrated by way of example and is not limited in the figures of the accompanying drawings, in which like references indicate similar elements.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those skilled in the art to practice the invention. The following detailed description is, therefore, not to be taken in a limiting sense, and the scope of the invention is defined only by the appended claims.

Figure 1:
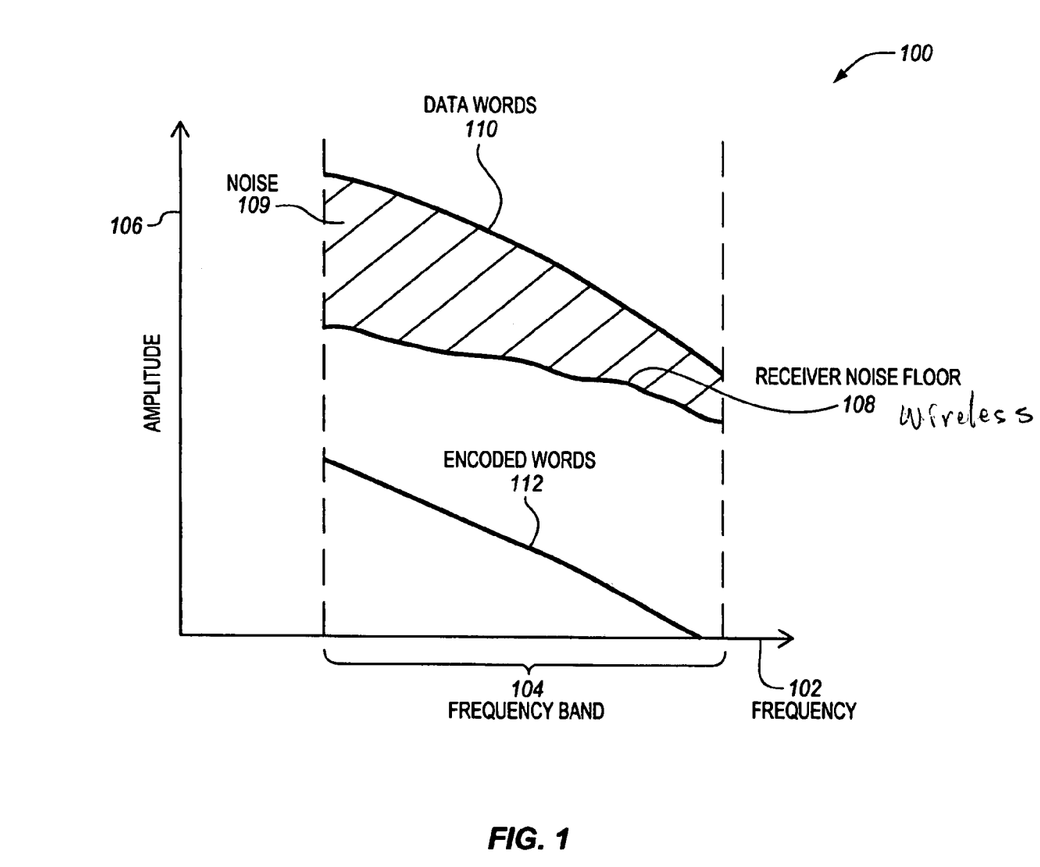
FIG. 1 illustrates noise reduction through encoding data words.

Data words transmitted across a data transmission bus are encoded before transmission and then are decoded after transmission across the data transmission bus. Encoding a data word, in the manner prescribed herein, lowers a power spectral density (PSD) of an encoded word frequency spectrum at a frequency of a wireless network below a wireless receiver's receiver noise floor, as is shown in FIG. 1 at 100, thereby eliminating a previously existing source of unwanted RF energy. Noise is reduced in specific regions of the encoded word frequency spectrum. This reduction in noise is achieved through the use of code words that in themselves exhibit spectral components at frequencies that do not interfere with the operation of the wireless network.

FIG. 1 illustrates noise reduction through encoding data words. With reference to FIG. 1, frequency 102 is plotted along the horizontal axis. Amplitude 106 is indicated on the vertical axis. The units for both axes may be expressed in any units that are consistent with these terms, the present invention is not limited thereby. For example, throughout this description the terms power spectral density and energy level may be used interchangeably, no limitation is implied thereby. In another instance, the term amplitude will be used to refer to the noise level being described. In one embodiment, all the energy levels plotted in FIG. 1 are measured at the input to the wireless receiver. An energy level shown as data words 110 represents the power spectral density of time averaged data radiated from a data transmission bus (as the data is transmitted across the data transmission bus in a data processing system) which is referenced to the input of the wireless receiver. Receiver noise floor 108 represents power spectral density of the noise floor of a wireless receiver located proximate to the data transmission bus, but unaffected by the radiated energy corresponding to data words 110. Illustrated in FIG. 1 is a reduction in receiver performance, since the amplitude of the PSD represented by data words 110 is greater than the amplitude of the PSD represented by receiver noise floor 108. When data words 110 are close to or greater than receiver noise floor 108, unwanted noise will be received by the wireless receiver; this condition is illustrated by noise 109, represented by the shaded area.

Encoding the data transmitted on the data transmission bus into encoded words lowers the energy level of the encoded words across a specific frequency band 104. The specific frequency band 104 can encompass one or more wireless network operating bands, as required by a particular design. In one embodiment, the specific frequency band 104 is substantially equal to the bandwidth of a wireless network. In another embodiment, the specific frequency band can be equal to a portion of the bandwidth of a wireless receiver, which is tuned to a specific channel within the frequency band of the wireless network. Thus, the previously unwanted noise introduced by the transmission of data on the data transmission bus has been greatly reduced across the specific frequency band 104. Such a condition results in reducing the PSD of encoded words 112 below the PSD of receiver noise floor 108. Through careful selection of a bit period used in conjunction with the data transmission bus and data encoding the effective RF energy level, at the input to the wireless receiver, can be reduced to a level that does not degrade the performance of the wireless network. It will be noted by those skilled in the art that the resulting noise level at the input to the receiver will be the power sum of all of the noise contributions present. Thus, consideration of the two distinct sources of noise at the wireless receiver; i.e., 108, and either of 110 or 112, would result in the incoherent sum of both energy levels. Therefore, the precise offset of encoded words 112 from the receiver noise floor 108 will be a matter specific to a given system design. Those skilled in the art will note that reducing encoded words 112 by an order of magnitude, relative to the receiver noise floor 108, will produce negligible increase in the receiver noise floor 108.

Figure 2:
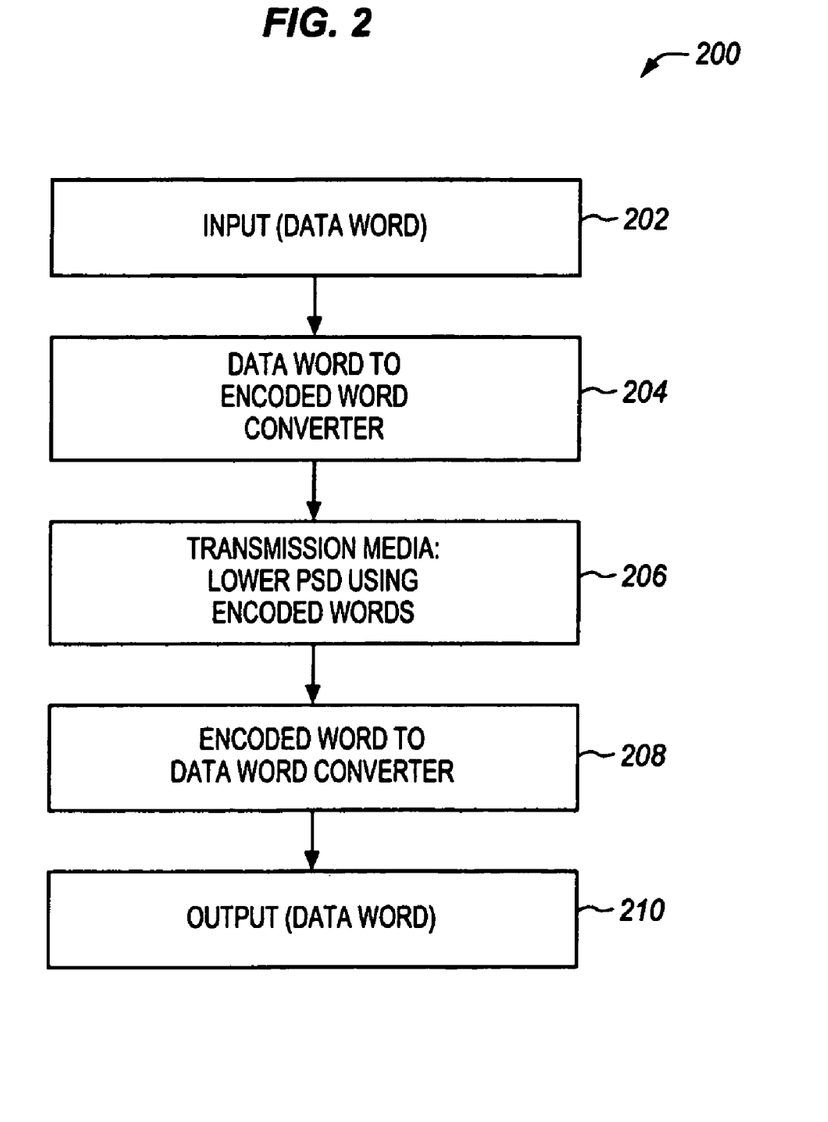
FIG. 2 depicts an embodiment of a method to reduce the power spectral density (PSD) of data words by encoding and decoding.

Application of the present invention to reduce the broadband energy radiated from the data processing system requires the encoding and subsequent decoding of data words. FIG. 2 depicts an embodiment of a method to reduce the power spectral density (PSD) of data words by encoding and decoding as shown at 200. Data words are input to the data processing system at 202. The data words are encoded at 204 to form encoded words. The encoded words are transmitted on the data transmission bus at 206 with a lowered PSD level in the operating frequency band of the wireless receiver. Following transmission across the data transmission bus, the encoded words are decoded at 208 to recover the data words. The data words are output at 210 and the method is complete.

Figure 3:
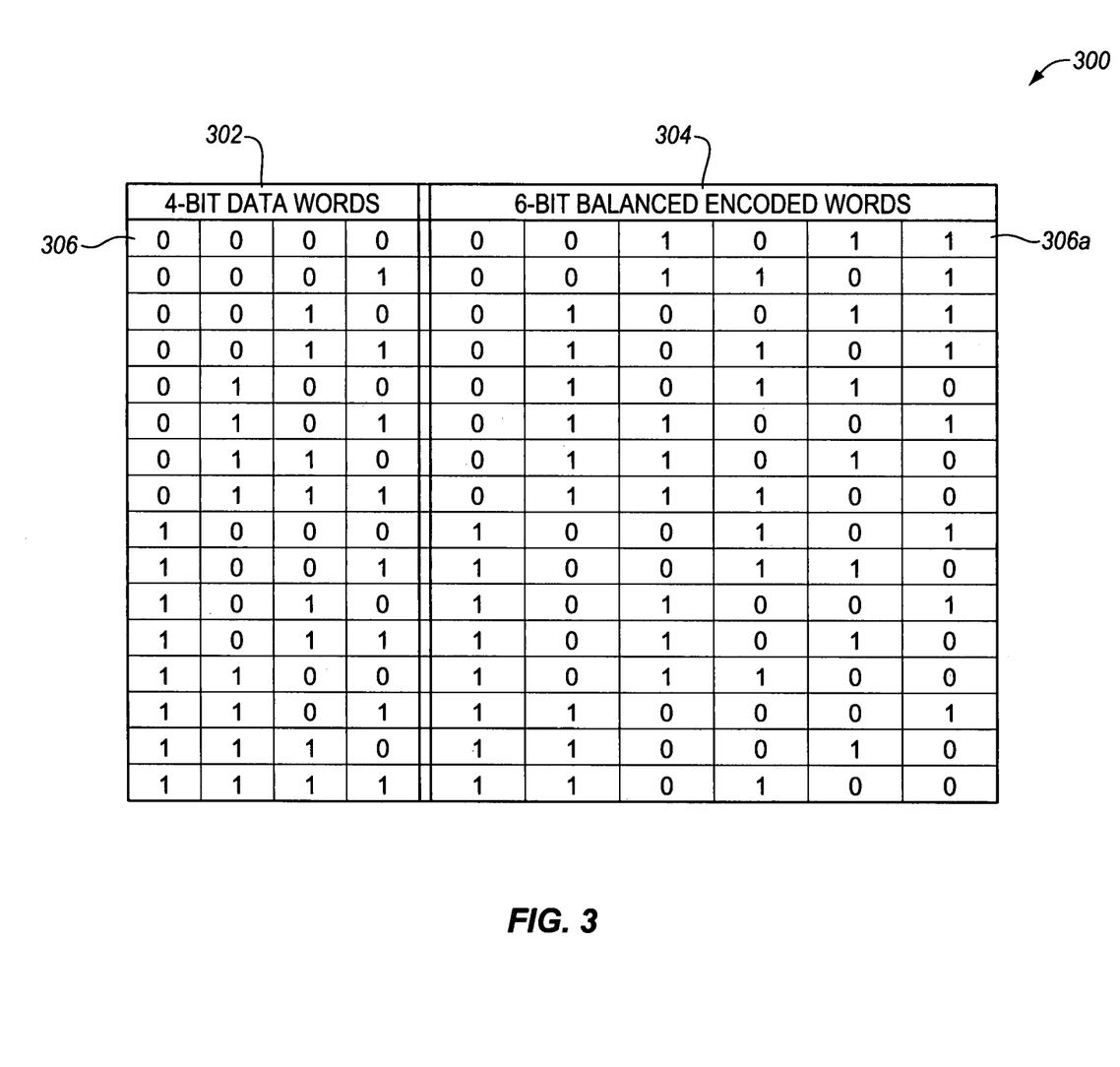
FIG. 3 illustrates one embodiment, according to the present invention, for encoding four-bit data words.

Many types of encoding can be employed within the teaching of the present invention. The type of encoding applied to the input data words does not limit the present invention. FIG. 3 illustrates one embodiment at 300, according to the present invention, for encoding four-bit data words. The encoding illustrated in FIG. 3 balances 4-bit input data words by adding two bits and selecting only code words that exhibit the desired characteristics. These characteristics include a high transition rate and a balanced weight of the resulting encoded word. A high transition rate or a high rate requires a transition between a "one" and a "zero" state at a frequency comparable to the bandwidth of the wireless receiver to be protected. A balanced encoded word has an equal number of bits in the "one" state and the "zero" state. With reference to FIG. 3, 16 unique data words represented by all possible combinations of the four input data bits are shown at 302. The corresponding balanced encoded words are shown at 304. The correspondence between input data word and the corresponding encoded word is illustrated on a row by row basis within the table at 300. For example, input 4-bit data word 306, having values "0000" is encoded and has values "001011" at 306a. The same convention is maintained throughout the rest of the rows shown in 300 (not numbered).

Figure 4A:
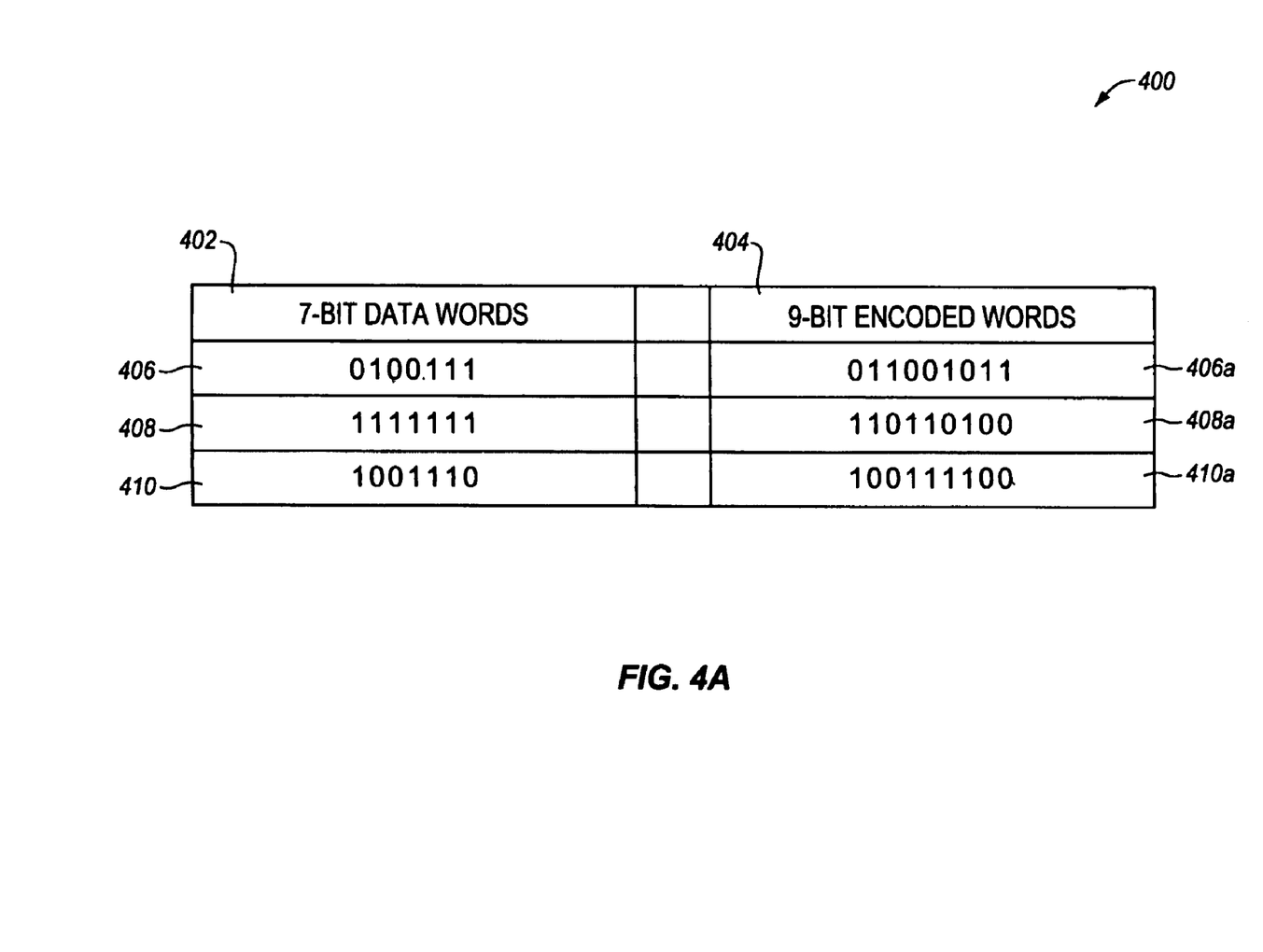
FIG. 4A illustrates one embodiment, according to the present invention, of encoding 7-bit data words.

Another embodiment according to the teaching of the present invention for encoding data words is illustrated in FIG. 4A at 400. FIG. 4A illustrates an embodiment for encoding 7-bit data words into 9-bit encoded words with a high transition rate that results in substantially balanced 9-bit encoded word weights. A balanced word weight contains an equal number of "ones" and "zeros" in a given word whereas a substantially balanced word weight does not contain an equivalent number of "ones" and "zeros" in a given word. Three representative input 7-bit data words are shown at 402, the corresponding encoded 9-bit words are shown at 404. The encoding algorithm used to produce the 9-bit encoded words employs two encoding rules:

1) that there be not more than two consecutive ones or zeros on either end of an encoded word; and
2) that there be not more than four consecutive ones or zeros in the interior portion of the data word.

In this embodiment of the present invention, "interior" is taken to mean all encoded bit locations within the encoded word, except for the two locations on either end of the encoded word.

Figure 4B:
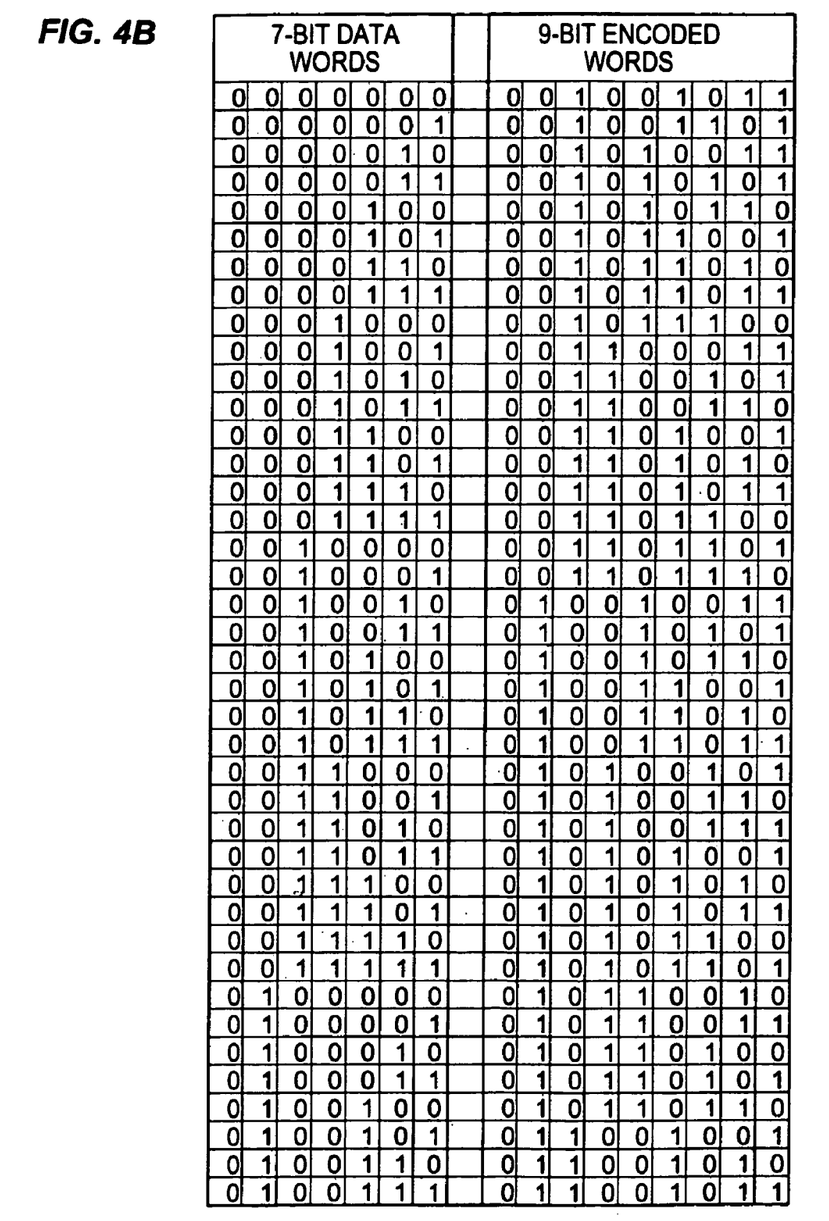
FIG. 4B illustrates 7-bit data words and corresponding 9-bit encoded words for a first subset of the 128 unique 7-bit data words.
Figure 4C:
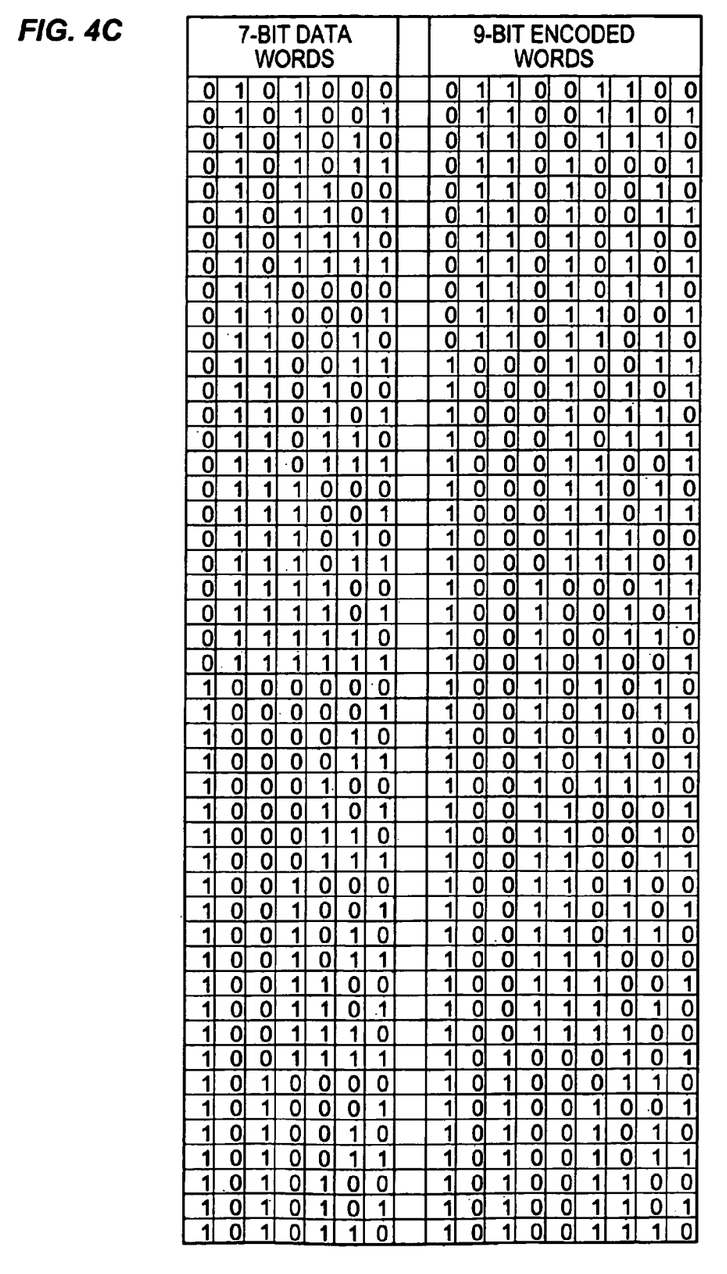
FIG. 4C illustrates 7-bit data words and corresponding 9-bit encoded words for a second subset of the 128 unique 7-bit data words.
Figure 4D:
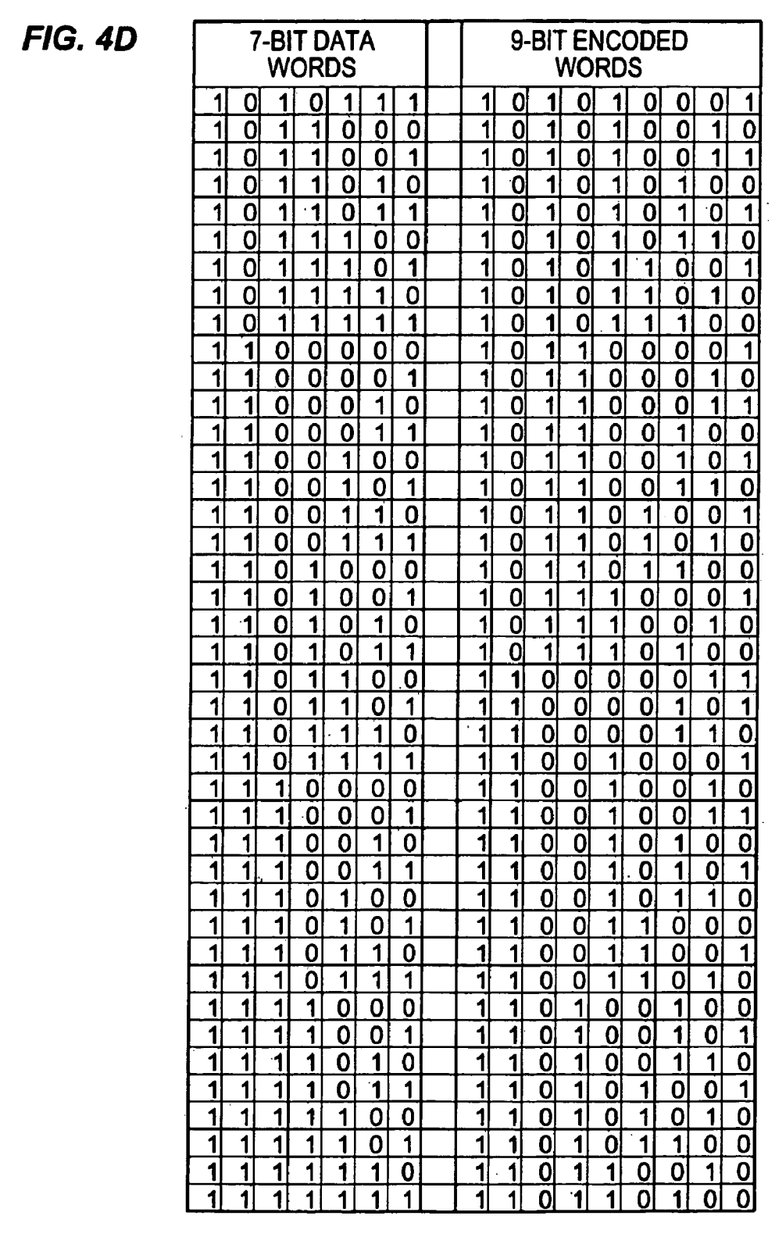
FIG. 4D illustrates 7-bit data words and corresponding 9-bit encoded words for a third subset of the 128 unique 7-bit data words.

With reference to FIG. 4A, a 4-bit data word 406 containing values "0100111" is encoded into a 9-bit encoded word at 406a having values "011001011." Encoded word 406a illustrates the first encoding rule wherein there are no more than two consecutive ones in the last two bit locations of encoded word 406a. Another 4-bit data word 408 containing values "111111" is encoded into a 9-bit encoded word at 408a having values "1110110100." Encoded word 408a also illustrates the first encoding rule wherein there are two ones in the first two bit locations and two consecutive zeros in the last two bit locations. The second encoding rule is illustrated by noting that data word 410 containing values "1001110" is encoded as 410a with encoded bits "100111100." Within encoded bit value 410a there are no more than four consecutive ones in the interior of the encoded word and no more than two consecutive zeros at the end of the data word. All 128 7-bit data words and their encoded counterparts according to the algorithm described herein are listed in FIG. 4B through FIG. 4D.

Figure 5:
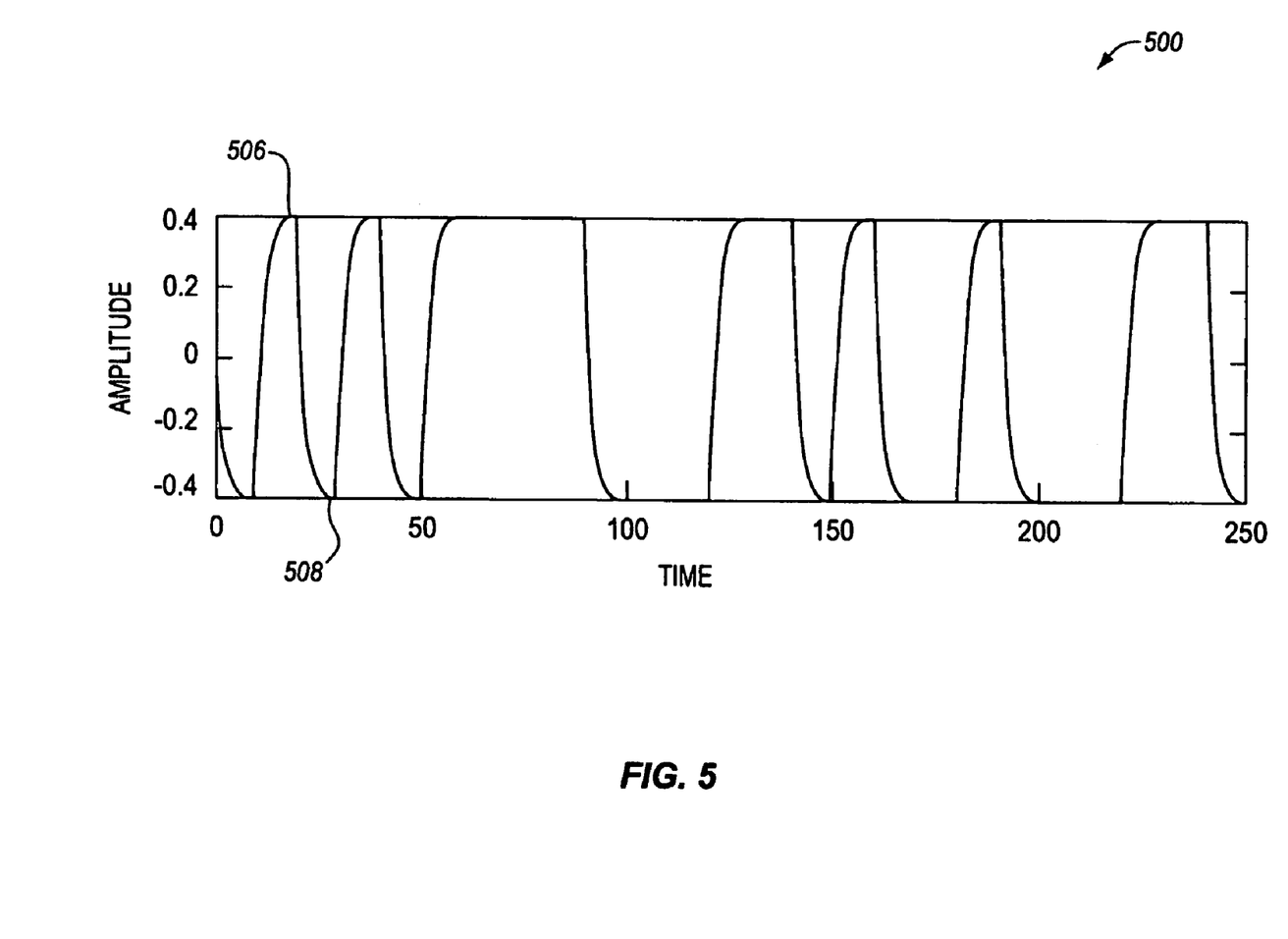
FIG. 5 displays the time series of encoded words following the encoding described in conjunction with FIG. 4.

FIG. 5 displays a time domain waveform of 7-bit data words previously described in conjunction with FIG. 4A through FIG. 4D. Time is indicated on horizontal axis 502 and amplitude is indicated at 504. A bit value corresponding to a "one" is indicated at 506 and a bit value corresponding to a "zero" is indicated at 508. Transformation of the time domain wave form (FIG. 5) to the frequency domain using Fourier transform techniques that are well known in the art produce the frequency spectrum illustrated in FIG. 6. FIG. 7 is created in a similar way by transforming a time domain signal of the encoded words (not shown) to the frequency domain.

Figure 6:
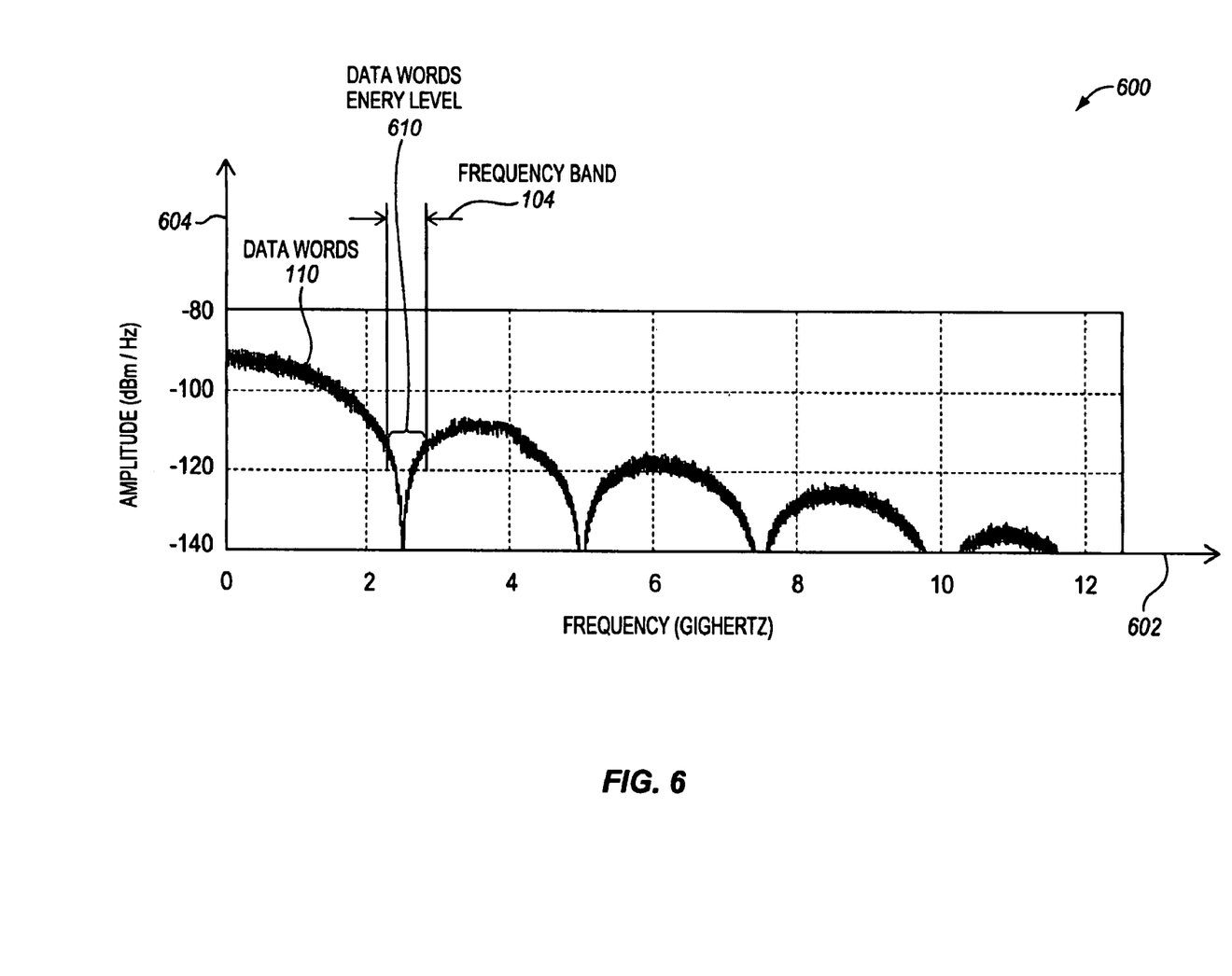
FIG. 6 illustrates a power spectral density (PSD) energy level of random 7-bit data words.
Figure 7:
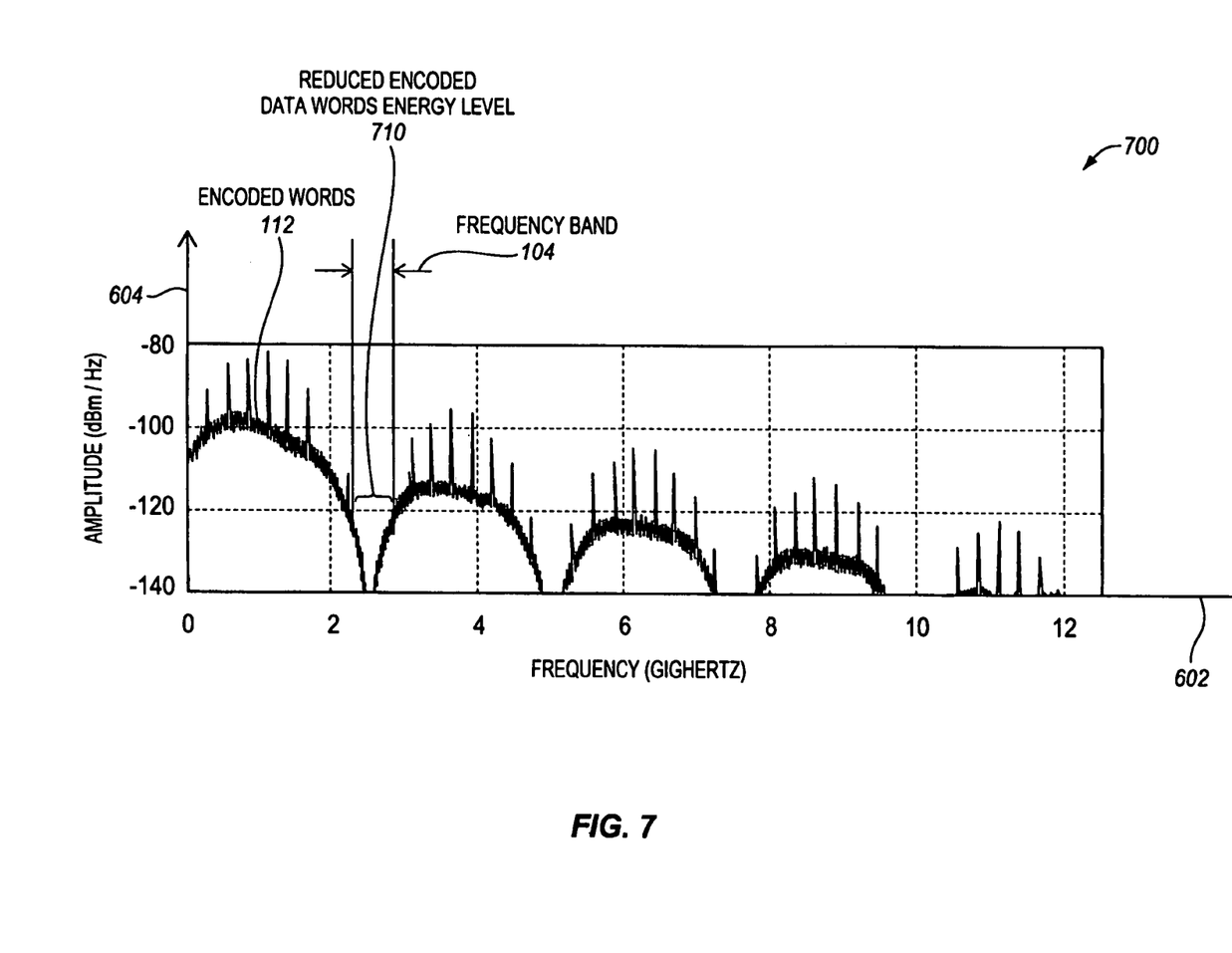
FIG. 7 illustrates a reduced encoded word power spectral density (PSD) energy level of the random 9-bit encoded words.

FIG. 6 illustrates a plot of a power spectral density (PSD) for a random 7-bit data stream. With reference to FIG. 6, frequency is indicated at 602, with units of gigahertz ($10^9$ cycles/sec) and amplitude at 604 with units of dBm/Hz (decibel reference a milliwatt per hertz). The data words 110 are represented by the distribution of energy shown. A clock frequency is selected so that the bit period, associated with the transmission of bits on the data transmission bus, results in the first null of the data words 110 located proximate to the specific frequency band 104. In one embodiment, the specific frequency band 104 corresponds to the wireless receiver's operating band as previously described in conjunction with FIG. 1. In one embodiment, it may be desirable to keep the amplitude of data words 110 below −120 dBm/Hz across the specific frequency band 104. Under this design constraint, data words energy level 610 exceeds −120 dBm/Hz and will reduce the performance of the wireless system as previously described in the proceeding figures. The problem presented in FIG. 6, excess noise on the input of the wireless receiver due to the transmission of the data words, is mitigated by employing the teachings of the present invention as shown in FIG. 7.

FIG. 7 illustrates an encoded word power spectral density (PSD), energy level that has been reduced by encoding the 7-bit data words (FIG. 6) to 9-bit encoded words. With reference to FIG. 7, in one embodiment, the encoded words 112 can represent the Fourier transform of the encoded words illustrated in FIG. 4A through FIG. 4D. A reduced encoded word energy level 710 is illustrated that meets the design constraint of maintaining a noise level at the input of the wireless receiver of −120 dBm/Hz or less.

The present invention is amenable to different embodiments designed to reduce the amplitude of the PSD of the transmitted encoded words depending on the operating frequency band of the wireless device of concern. For example, to facilitate operation of wireless devices in the frequency band 2.4 gigahertz to 2.48 gigahertz with a co-located data transmission bus, an embodiment of the present invention can be used to create a window from 2.4 gigahertz to 2.48 gigahertz that reduces the radiated RF energy affecting the wireless receiver due to the transmission of data on the data transmission bus. It should be noted that any skew in the time domain signal of the data on the bus (encoded or unencoded) will create a single line spectral component (tonal) at the second harmonic of the clock frequency used to clock the data transmission. This single line spectral component can potentially occur at the location of the null in the data words 110 spectrum or the encoded words 112 spectrum. In one embodiment, to avoid contaminating the wireless receiver's operating band with this single line component, the data is clocked at a frequency that will place the second harmonic of the clock outside of the wireless receiver's operating band. In this embodiment, the desired clock frequency is selected as 1.25 gigahertz and the second harmonic occurs at 2.5 gigahertz. The operating band of the wireless receiver is 2.4 gigahertz to 2.48 gigahertz. Thus, any spurious tonals arising from data skew are kept outside the operating band of the wireless receiver according to the teachings of the present invention. In one embodiment, an 18-bit data word can be encoded to create a 20-bit encoded word. An effective data transfer rate of 2.25 gigabits per second will be realized on the data transmission bus, using look-up tables or suitable algorithms to perform the encoding. An algorithm embodying rules similar to those described in the earlier 7-bit to 9-bit encoding example can be used, or other encoding algorithms may be employed.

At the data transfer rate of 2.25 gigabits per second the spectrum of the data signal is distributed over a band of 2.25 gigahertz centered on the frequency of 1.125 gigahertz. A second lobe of the data signal is centered on 3.375 gigahertz. The encoded word transfer rate becomes 2.5 gigabits per second and the spectrum of the encoded words is distributed around the frequency of 1.25 gigahertz. However, the energy level of the primary lobe of the encoded word spectrum has been reduced both below 100 megahertz and above 2.4 gigahertz. Thus, a reduction in the energy level of the encoded word spectrum will exist between 2.4 gigahertz and 2.6 gigahertz, which is consistent with the goal of reducing the energy level in the wireless receiver's operating band of 2.4 gigahertz to 2.48 gigahertz.

In another embodiment, it may be desirable to overlap the null in the data words 110 spectrum or the null in the encoded words 112 spectrum with the specific frequency band 104. In this embodiment, the bit period is set to place the desired null within the specific frequency band 104. An advantage of this embodiment can result in a very low background noise level presented by the encoded word spectrum 112 to the specific frequency band 104 due to the presence of the null within the specific frequency band 104. The single line spectral component, described above, can be mitigated with techniques well known in the art when employing this embodiment of the present invention.

In an alternative embodiment, the data rates can be based on n*133 megahertz (Mhz), where n is any positive integer and 133 Mhz is a popular reference frequency used within the computing device. Selecting n=19 provides a data transfer rate of 2.527 gigabits per second. Using a 19-bit encoded word to transmit a 17-bit data word provides a data transfer rate of 2.261 gigabits per second.

An advantage of the coding algorithm previously described is its inherent high efficiency of 17/19. Higher efficiencies can be obtained for narrower frequency bands by increasing the length of the data word. For example, a 50-bit data word would be encoded to 52-bits with an efficiency of 50/52.

The present invention can alternatively be used to decrease interference with cellular telephone wireless networks operating at 1.8 gigahertz and 1.9 gigahertz. Thus, the present invention is generally applicable to reducing radiated RF energy that would present a source of interference to a wireless network. The present invention is not limited by the operating frequency band of the wireless network.

It will be appreciated that the methods described in conjunction with the figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Thus, novel methods and apparatuses to reduce the power spectral density levels of a broadband signal using data encoding techniques are described. Although the invention is described herein with reference to specific preferred embodiments, many modifications therein will readily occur to those of ordinary skill in the art. Accordingly, all such variations and modifications are included within the intended scope of the invention as defined by the following claims.

What is claimed is:

1. An apparatus, comprising:
   an encoder to receive and to encode a data word, wherein a power spectral density of emitted RF energy of an encoded word when transmitted across a data transmission bus is to be lowered across a specific frequency band relative to a power spectral density of the data word, the specific frequency band corresponding to an operating frequency of a wireless receiver;
   a data transmission bus coupled with the encoder to receive and transmit the encoded word, wherein a clock frequency of the data transmission bus is selected based on the specific frequency band; and
   a decoder coupled with the data transmission bus to receive and to decode the encoded word wherein the data word is to be obtained from the encoded word.

2. The apparatus of claim 1, wherein the encoder to cause transitions within the encoded word at a rate equivalent to a bandwidth to be protected, the bandwidth to be protected coinciding with the operating frequency of the wireless receiver.

3. The apparatus of claim 1, wherein the encoder is further to substantially balance a weight of the encoded word.

4. The apparatus of claim 1, wherein the encoder is further to substantially balance a weight of at least two consecutive encoded words.

5. The apparatus of claim 1, wherein the clock frequency of the data transmission bus is selected to cause a null in a power spectrum of bits transmitted on the data transmission bus to overlap with a wireless network frequency.

6. The apparatus of claim 5, wherein the specific frequency band is substantially equal to a wireless network frequency band.

7. The apparatus of claim 5, wherein a reciprocal of a bit period is set to fall within the specific frequency band selected from the group consisting of 1.7 to 1.8 gigahertz, 1.8 to 1.9 gigahertz, and 2.4 to 2.5 gigahertz.

8. The apparatus of claim 1, wherein the clock frequency of the data transmission bus is selected to place the specific frequency band proximate to a wireless network frequency band.

9. The apparatus of claim 8, wherein the specific frequency band is substantially equal to a wireless network frequency band.

10. The apparatus of claim 8, wherein a reciprocal of a bit period is set to fall within the specific frequency band selected from the group consisting of 1.7 to 1.8 gigahertz, 1.8 to 1.9 gigahertz, and 2.4 to 2.5 gigahertz.

11. An apparatus, comprising:
    an encoder to receive and to encode a first data word, wherein a power spectral density of emitted RF energy of a first encoded word when transmitted across a date transmission bus is to be lowered across a specific frequency band relative to a power spectral density of the first data word, the specific frequency band corresponding to an operating frequency of a wireless receiver;
    a data transmission bus coupled with the encoder to receive and transmit the first encoded word, wherein a clock frequency of the data transmission bus is selected based on the specific frequency band; and
    a decoder coupled with the data transmission bus to receive and to decode a second encoded word wherein a second data word is to be obtained from the second encoded word.

12. The apparatus of claim 11, wherein the encoder is further to substantially balance a weight of the first encoded word.

13. The apparatus of claim 11, wherein the clock frequency of the data transmission bus is selected to cause a null in a power spectrum of bits transmitted on the data transmission bus to overlap with a wireless network frequency.

14. The apparatus of claim 11, wherein the clock frequency of the data transmission bus is selected to place the specific frequency band proximate to a wireless network frequency band.

15. An apparatus, comprising:
    an encoder to receive and to encode a data word, wherein a power spectral density of emitted RF energy of an encoded word when transmitted across a data transmission bus is to be lowered across a specific frequency band relative to a power spectral density of the data word and a clock frequency of a data transmission bus, to receive the encoded word, is selected based on the specific frequency band, the specific frequency band corresponding to an operating frequency of a wireless receiver.

16. The apparatus of claim 15, wherein the encoder to substantially balance a weight of the encoded word.

17. The apparatus of claim 15, wherein the clock frequency of the data transmission bus is selected to cause a null in a power spectrum of bits transmitted on the data transmission bus to overlap with a wireless network frequency.

18. The apparatus of claim 15, wherein the clock frequency of the data transmission bus is selected to place the specific frequency band proximate to a wireless network frequency band.

19. An apparatus, comprising:
    a decoder to receive an encoded word from a data transmission bus and to decode the encoded word to obtain a data word from the encoded word, wherein a power spectral density of emitted RF energy of the encoded word when transmitted over the data transmission bus is to be lowered across a specific frequency band relative to a power spectral density of the data word and a clock frequency of a data transmission bus, to receive the encoded word, is selected based on the specific frequency band, the specific frequency band corresponding to an operating frequency of a wireless receiver.

20. The apparatus of claim 19, wherein the encoder is further to substantially balance a weight of the encoded word.

21. The apparatus of claim 19, wherein the clock frequency of the data transmission bus is selected to cause a null in a power spectrum of bits transmitted on the data transmission bus to overlap with a wireless network frequency.

22. The apparatus of claim 19, wherein the clock frequency of the data transmission bus is selected to place the specific frequency band proximate to a wireless network frequency band.

23. An apparatus comprising:
a processor;
a data transmission bus wherein a clock frequency of the data transmission bus is selected based on a specific frequency band, the specific frequency band corresponding to an operating frequency of a wireless receiver;
a memory to communicate with the processor;
an encoder coupled with the data transmission bus, to receive and to encode a data word, wherein a power spectral density of emitted RF energy of an encoded word when transmitted across the data transmission bus is to be lowered across the specific frequency band relative to a power spectral density of the data word; and
a decoder coupled with the data transmission bus to receive and to decode the encoded word wherein the data word is to be obtained from the encoded word.

24. The apparatus of claim 23, wherein the encoder is further to cause transitions within the encoded word at a rate equivalent to a bandwidth to be protected.

25. A method comprising:
encoding a data word, wherein a power spectral density of emitted RF energy of an encoded word when transmitted across a data transmission bus is lowered across a specific frequency band, the specific frequency band corresponding to an operating frequency of a wireless receiver;
transmitting the encoded word on a data transmission bus, wherein a clock frequency of the data transmission bus is selected to place the specific frequency band proximate to a wireless network frequency band; and
decoding the encoded word, received from the data transmission bus, wherein the data word is obtained from the encoded word.

26. The method of claim 25, wherein the encoding causes transitions within the encoded word at a rate equivalent to a bandwidth to be protected.

27. The method of claim 25, wherein the encoding the data word substantially balances a weight of the encoded word.

28. The method of claim 25, wherein the encoding the data word substantially balances a weight of at least two consecutive encoded words.

29. The method of claim 25, wherein the specific frequency band is substantially equal to a wireless network frequency band.

30. The method of claim 25, wherein a reciprocal of a bit period is set to fall within the specific frequency band selected from the group consisting of 1.7 to 1.8 gigahertz, 1.8 to 1.9 gigahertz, and 2.4 to 2.5 gigahertz.

31. A computer readable medium containing executable computer program instructions, which when executed by a data processing system, cause the data processing system to perform a method comprising:
encoding a data word, wherein a power spectral density of emitted RF energy of an encoded word when transmitted across a data transmission bus is lowered across a specific frequency band, the specific frequency band corresponding to an operating frequency of a wireless receiver;
transmitting the encoded word on a data transmission bus wherein a clock frequency of the data transmission bus is selected to cause a null in a power spectrum of bits transmitted on the data transmission bus to overlap with a wireless network frequency; and
decoding the encoded word, received from the data transmission bus, wherein the data word is obtained from the encoded word.

32. The computer readable medium as set forth in claim 31, wherein the encoder causes transitions within the encoded word at a rate equivalent to a bandwidth to be protected.

33. The computer readable medium as set forth in claim 31, wherein the encoding the data word substantially balances a weight of the encoded word.

34. The computer readable medium as set forth in claim 31, wherein the encoding the data word substantially balances a weight of at least two consecutive encoded words.

35. The computer readable medium as set forth in claim 31, wherein the specific frequency band is substantially equal to a wireless network frequency band.

36. The computer readable medium as set forth in claim 31, wherein a reciprocal of a bit period is set to fall within the specific frequency band selected from the group consisting of 1.7 to 1.8 gigahertz, 1.8 to 1.9 gigahertz, and 2.4 to 2.5 gigahertz.

37. An apparatus to process data comprising:
a means for encoding a data word, wherein a power spectral density of emitted RF energy of an encoded data word when transmitted across a data transmission bus is lowered across a specific frequency band, the specific frequency band corresponding to an operating frequency of a wireless receiver;
a means for transmitting the encoded data word across a data transmission bus, wherein a clock frequency of the data transmission bus is selected to place the specific frequency band proximate to a wireless network frequency band; and
a means for recovering the data word after transmission of the encoded data word across the transmission bus, wherein the data word is obtained from the encoded data word.

38. Said apparatus of claim 37, wherein said means for lowering, lowers a power spectral density of at least two consecutive data words.

* * * * *